(12) United States Patent
Huang et al.

(10) Patent No.: US 7,440,045 B2
(45) Date of Patent: Oct. 21, 2008

(54) FLAT PANEL DISPLAY HAVING A BRIGHTNESS ENHANCEMENT DIFFUSER PLATE WITH TWO DIFFUSING LAYERS

(75) Inventors: Chi-Jen Huang, Taichung (TW); Chih-Li Chang, Tainan (TW)

(73) Assignee: Hannstar Display Corporation, Taipei County (TW)

( * ) Notice: Subject to any disclaimer, the term of this patent is extended or adjusted under 35 U.S.C. 154(b) by 346 days.

(21) Appl. No.: 10/905,766

(22) Filed: Jan. 20, 2005

(65) Prior Publication Data

US 2005/0275767 A1 Dec. 15, 2005

(30) Foreign Application Priority Data

Jun. 11, 2004 (TW) .............................. 93116793 A

(51) Int. Cl.
G02F 1/1335 (2006.01)

(52) U.S. Cl. .......................................... 349/64; 349/62

(58) Field of Classification Search ................... 349/64, 349/62

See application file for complete search history.

(56) References Cited

U.S. PATENT DOCUMENTS

| | | | |
|---|---|---|---|
| 5,706,065 A | 1/1998 | Yano | ........................... 349/112 |
| 6,261,664 B1 | 7/2001 | Beeson et al. | ................ 428/141 |
| 2004/0032725 A1* | 2/2004 | Hsieh et al. | .................... 362/31 |
| 2004/0066645 A1* | 4/2004 | Graf et al. | ....................... 362/31 |
| 2004/0114065 A1* | 6/2004 | Yu et al. | ......................... 349/61 |
| 2004/0114372 A1* | 6/2004 | Han et al. | .................... 362/330 |
| 2005/0206805 A1* | 9/2005 | Lee et al. | ....................... 349/64 |
| 2006/0139749 A1* | 6/2006 | Watanabe et al. | ........... 359/460 |

* cited by examiner

*Primary Examiner*—Andrew Schechter
*Assistant Examiner*—Nathanael R Briggs
(74) *Attorney, Agent, or Firm*—Jianq Chyun IP Office

(57) ABSTRACT

A flat panel display including a backlight module, a liquid crystal display panel, and a brightness enhancement diffuser plate (BEDP) is provided. The liquid crystal display panel is disposed on the backlight module, and the BEDP is disposed between the backlight module and the liquid crystal display panel. Furthermore, the BEDP includes a first and a second diffusion layers embedded to each other, wherein the first diffusion layer is disposed near the liquid crystal display panel, the second diffusion layer is disposed near the backlight module, and the first and the second diffusion layers have different refractive indexes, transmittances and haze values, so that optical performance of the flat panel display is optimized.

17 Claims, 2 Drawing Sheets

FLAT PANEL DISPLAY HAVING A BRIGHTNESS ENHANCEMENT DIFFUSER PLATE WITH TWO DIFFUSING LAYERS

CROSS-REFERENCE TO RELATED APPLICATION

This application claims the priority benefit of Taiwan application serial no. 93116793, filed on Jun. 11, 2004, and of Taiwan application serial no. 93133298, filed on Nov. 2, 2004. All disclosures of the Taiwan applications are hereby incorporated by reference.

BACKGROUND OF THE INVENTION

1. Field of the Invention

The present invention generally relates to a flat panel display; more particularly to a flat panel display with a brightness enhancement diffuser plate.

2. Description of Related Art

With the development of high technology, video product, especially digital video or imaging devices have become a common product in our everyday life. Among these video or imaging devices, display panels are vital devices for displaying associated information. Users may read information via the display panels or further control the operation of the devices.

Most noticeable display panels, such as Liquid Crystal Display (LCD), are flat panel displays developed by combining optoelectronic technology and semiconductor manufacturing technology. Since the LCD has several features including low voltage operation, radiation free, light weight and compact in size, it recently becomes a main research subject. Especially large size LCD TV is aggressively being developed nowadays in the industry and becomes a mainstream in large size flat TV because it has the advantages of large size image, good image quality, wide viewing angles and high luminance.

FIG. 1 is a cross sectional view of a conventional LCD. Referring to FIG. 1, LCD usually is consisted of a backlight module 100 for emitting light and a liquid display panel 110 for displaying images, wherein the backlight module 100 includes a lamp 102 and a reflecting plate (not shown) for masking the lamp 102. In addition, to avoid directly observing lamp mura over the lamp 102, a diffuser plate 120 for diffusing light emitting from the lamp 102 is usually disposed between the backlight module 100 and the display panel 110. Typically, a diffuser plate 120 with a higher haze value and a lower total transmittance is selected. However, such a configuration will result in a lower brightness, which in turn additionally a brightness enhancement film 140 is needed for enhancing brightness. Furthermore, a diffuser sheet 130 is required to be added on the diffuser plate 120 to avoid directly observing the shape of the lamp 102 if the diffuser plate 120 with higher transmittance is employed.

In conclusion, nowadays, several layers of optical film are used in assembling LCD, thereby increasing the cost and assembling time.

SUMMARY OF THE INVENTION

Accordingly, the present invention is directed to a flat panel display for maintaining optical performance and reducing cost of optical films at the same time.

The present invention is further directed to a flat panel display for reducing the number of optical films.

The present invention is further directed to a flat panel display for maintaining image quality and reducing cost of optical films at the same time.

The present invention is further directed to a flat panel display for reducing assembling time.

The invention provides a flat panel display that includes a backlight module, a liquid crystal display panel and a brightness enhancement diffuser plate. The liquid crystal display panel is disposed on the backlight module, and the brightness enhancement diffuser plate is disposed between the backlight module and the liquid crystal display panel. Furthermore, the brightness enhancement diffuser plate includes a first and a second diffuser layers embedded to each other, wherein the first diffuser layer is disposed near the liquid crystal display panel, the second diffuser layer is disposed near the backlight module, and the first and the second diffuser layers have different refractive indexes, transmittances and haze values.

A flat panel display is provided by the invention, wherein the flat panel display includes a backlight module, a liquid crystal display panel and a brightness enhancement diffuser plate. The liquid crystal display panel is disposed on the backlight module, and the brightness enhancement diffuser plate is disposed between the backlight module and the liquid crystal display panel. Furthermore, the brightness enhancement diffuser plate includes a first and a second diffuser layers embedded to each other, wherein the first diffuser layer is disposed near the liquid crystal display panel, the second diffuser layer is disposed near the backlight module, and the refractive index of the first diffuser layer is larger than that of the second diffuser layer.

A flat panel display provided by the invention includes a backlight module, a liquid crystal display panel and a brightness enhancement diffuser plate. The liquid crystal display panel is disposed on the backlight module, and the brightness enhancement diffuser plate is disposed between the backlight module and the liquid crystal display panel. Furthermore, the brightness enhancement diffuser plate includes a first and a second diffuser layers embedded to each other, wherein the first diffuser layer is disposed near the liquid crystal display panel, the second diffuser layer is disposed near the backlight module, and the transmittance of the first diffuser layer is smaller than that of the second diffuser layer.

A flat panel display provided by the invention includes a backlight module, a liquid crystal display panel and a brightness enhancement diffuser plate. The liquid crystal display panel is disposed on the backlight module, and the brightness enhancement diffuser plate is disposed between the backlight module and the liquid crystal display panel. Furthermore, the brightness enhancement diffuser plate includes a first and a second diffuser layers embedded to each other, wherein the first diffuser layer is disposed near the liquid crystal display panel, the second diffuser layer is disposed near the backlight module, and the haze value of the first diffuser layer is larger than that of the second diffuser layer.

Since the invention adopts the brightness enhancement diffuser plate comprised of two diffuser layers having different optical characteristics, the flat panel display can attain optimal optical performance, maintain optical performance and image quality, as well as reduce assembling time by diffusing and then converging the light emitting from the backlight module.

The objectives, other features and advantages of the invention will become more apparent and easily understood from the following detailed description of the invention when taken in conjunction with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
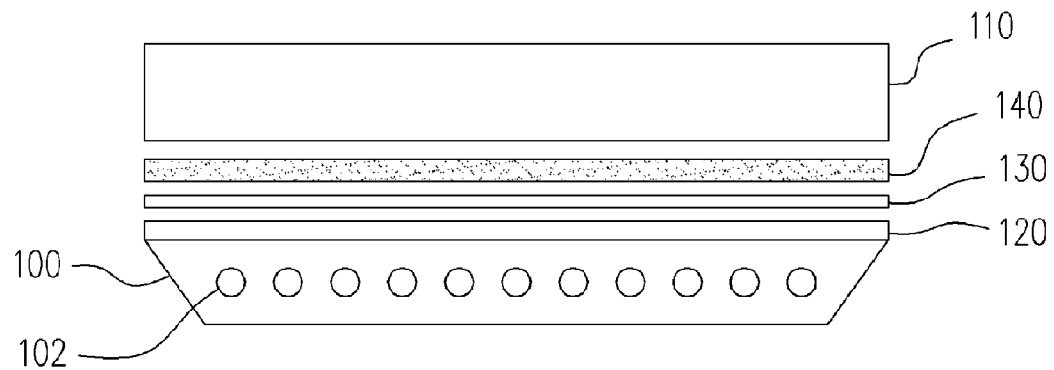
FIG. 1 is a cross sectional view of a conventional flat panel display.

Reference will now be made in detail to the present preferred embodiments of the invention, examples of which are illustrated in the accompanying drawings. Wherever possible, the same reference numbers are used in the drawings and the description to refer to the same or like parts.

Figure 2:
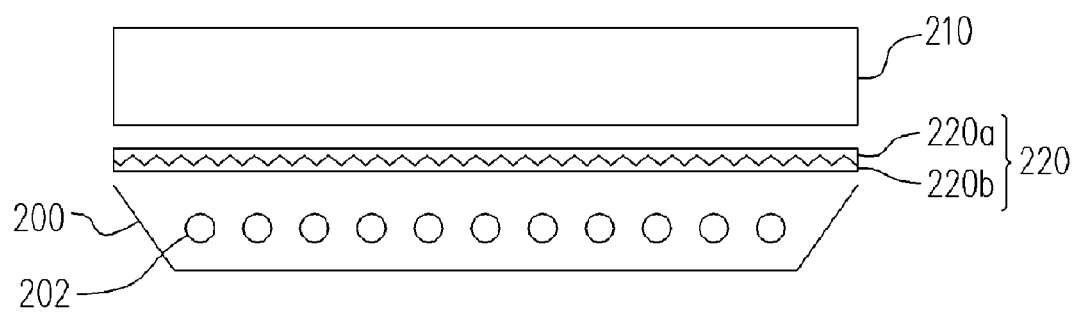
FIG. 2 is a cross sectional view of a flat panel display according to an embodiment of the invention.

FIG. 2 is a cross sectional view of an embodiment of a flat panel display according to the invention. Referring to FIG. 2, a flat panel display of this embodiment includes a backlight module 200, a liquid crystal display panel 210 disposed on the backlight module 200 and a brightness enhancement diffuser plate 220, wherein the backlight module 200 may be a direct type backlight module. Besides, the brightness enhancement diffuser plate 220 is disposed between the backlight module 200 and the liquid crystal display panel 210. Furthermore, the brightness enhancement diffuser plate 220 includes a first diffuser layer 220a and a second diffuser layer 220b embedded to each other, wherein the first diffuser layer 220a is disposed near the liquid crystal display panel 210, the second diffuser layer 220b is disposed near the backlight module 200, and the first diffuser layer 220a and the second diffuser layer 220b have different refractive indexes, transmittances and haze values.

In the first embodiment, the refractive index of the first diffuser layer 220a is larger than that of the second diffuser layer 220b. Preferably, the ratio of refractive index of the first diffuser layer 220a to the second diffuser layer 220b is between 1.01 and 1.40; or the refractive index of the first diffuser layer 220a is between 1.50 and 1.90 while the refractive index of the second diffuser layer 220b is between 1.40 and 1.60.

In the second embodiment, the transmittance of the first diffuser layer 220a is smaller than that of the second diffuser layer 220b. Preferably, the ratio of the transmittance of the first diffuser layer 220a to the second diffuser layer 220b is between 0.70 and 1.00; or the transmittance of the first diffuser layer 220a is between 0.70 and 0.85 while the transmittance of the second diffuser layer 220b is between 0.85 and 0.90.

In the third embodiment, the haze value of the first diffuser layer 220a is larger than that of the second diffuser layer 220b. Preferably, the ratio of the haze value of the second diffuser layer 220b to the first diffuser layer 220a is between 0.80 and 1.00; or the haze value of the first diffuser layer 220a is between 0.90 and 0.96, while the haze value of the second diffuser layer 220b is between 0.86 and 0.90.

In the forth embodiment, the refractive index of the first diffuser layer 220a is larger than that of the second diffuser layer 220b, the transmittance of the first diffuser layer 220a is smaller than that of the second diffuser layer 220b, and the haze value of the first diffuser layer 220a is larger than that of the second diffuser layer 220b.

It can be concluded from the first embodiment, the second embodiment, the third embodiment and the forth embodiment that the refractive index, the transmittance and the haze value of the first diffuser layer 220a and those of the second diffuser layer 220b can be coordinated in any way depending on the requirement of the product. In addition, individual components in the drawings are not drawn in scale, i.e. the total thickness of the composite diffuser plate 220 and individual thickness of the first diffuser layer 220a and the second diffuser layer 220b can be varied according to requirements of practical design, not limited to the scale shown in the drawings.

Furthermore, the lamp 202 of the backlight module 200 of the invention may be a cold cathode fluorescent lamp, a light emitting diode, an external electrode fluorescent lamp, an electroluminescent or a flat lamp plate. In addition, pertaining to the detail structure of the composite diffuser plate 220 will refer to FIG. 3.

Figure 3:
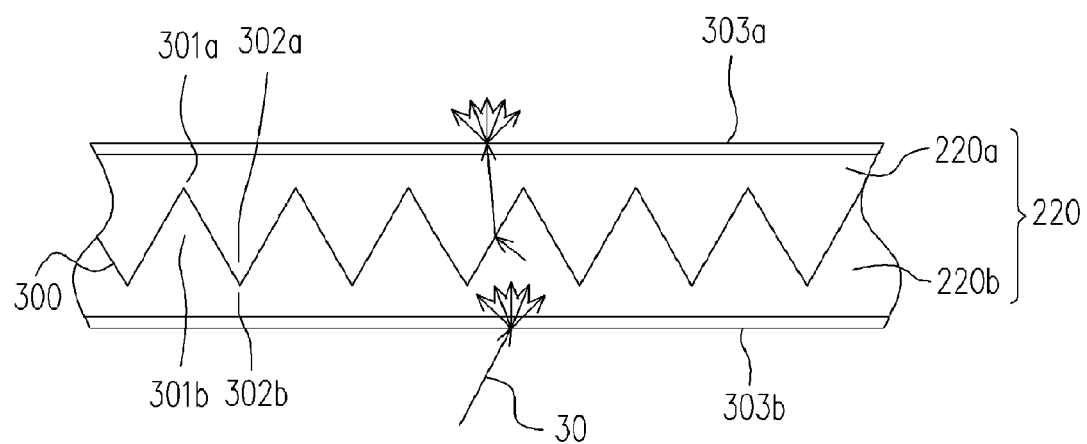
FIG. 3 is a cross sectional enlarged view of a brightness enhancement diffuser plate of a flat panel display in FIG. 1.

FIG. 3 is a cross sectional enlarged view of the composite diffuser plate 220 of a flat panel display in FIG. 1. A first diffuser layer 220a includes a first recess 301a and a first protrusion 302a and a second diffuser layer 220b includes a second recess 302b and a second protrusion 301b, wherein the first recess 301a and the second protrusion 301b are embedded to each other, and the second recess 302b and the first protrusion 302a are embedded to each other as well. An embedding interface 300 between the first diffuser layer 220a and the second diffuser layer 220b may be a prism interface as shown in FIG. 3, or a simple geometric surface, a wavy surface, a Fourier series curve surface, a fractal curve surface and one of other nonlinear shape surfaces.

The so-called simple geometric surface includes either a variety of simple flat planes and tilted planes and the prism interface as shown in FIG. 3 may be regarded as the simple geometric surface consisted of simple tilted planes. The so-called wavy surface has a cross sectional curve line, which can be described with a sinusoidal or a cosinusoidal function. The Fourier series curve surface has a cross sectional curve line, which can be described by Fourier series. The fractal curve surface has a cross sectional curve line that includes fractional dimension that has a self-imitating feature; in other words, in a gradually contracting scale, the details will be replicated in a certain type of contracting manner, which results in a complicated curve surface with a certain type of reiteration. Other nonlinear shape surfaces are curve surfaces other than various curve surfaces described above and cannot be described by mathematical models.

In addition, to enhance the function of the brightness enhancement diffuser plate of the invention, the first diffuser layer 220a may proceed with a matte process, thereby forming an auxiliary diffuser layer 303a over the emitting surface of the first diffuser layer 220a to enhance a diffusing effect. A transparent conductive film 303b made of indium tin oxide or other transparent conductive material is disposed on an incident surface of the second diffuser layer 220b to serve as electrical ground, thereby also enhancing the diffusion effect.

Accordingly, when the light 30 from the back light module 200 (as shown in FIG. 2) is incident on the interface 300 via the second diffuser layer 220b, the incident light refracts via the prism interface 300 such that light 30 is deviated in the direction of the brightness enhancement diffuser plate to attain the light converging effect.

Figure 4:
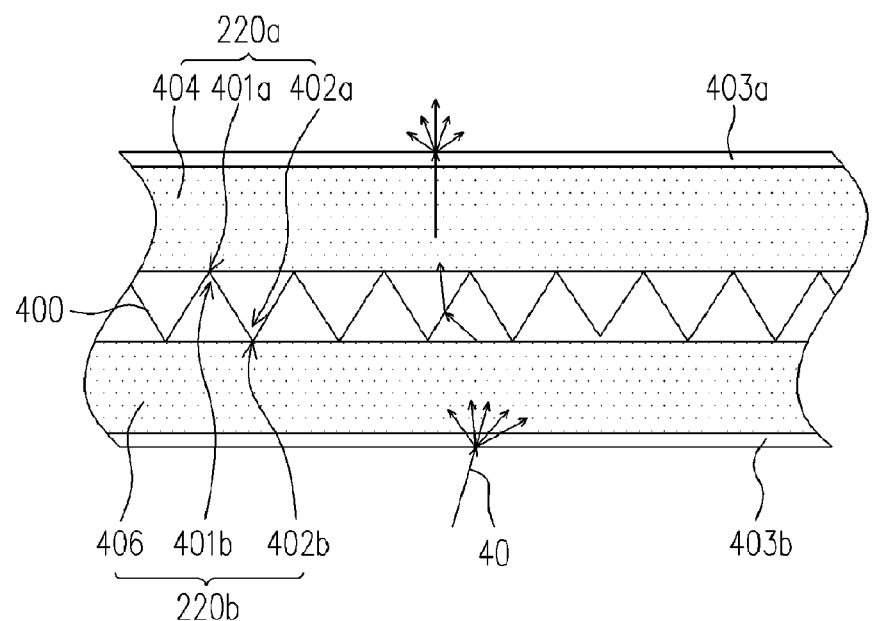
FIG. 4 is a cross sectional enlarged view of another brightness enhancement diffuser plate of a flat panel display in FIG. 1.

In addition, there are other types of brightness enhancement diffuser plates, as shown in FIG. 4. FIG. 4 is a cross sectional enlarged view of another brightness enhancement diffuser plate of a flat panel display in FIG. 1. Wherein the first diffuser layer 220a comprises a first plate 404, a first recess 401a and a first protrusion 402a. The first recess 401a and the first protrusion 402a are disposed on the first plate 404, wherein the first protrusion 402a and the first plate 404 have different transmittances and different haze values, but almost near refractive indexes. Furthermore, the second diffuser layer 220b comprises a second plate 406, a second protrusion 401b and a second recess 402b. The second protrusion 401b and the second recess 402b are disposed on the second plate 406, wherein the second protrusion 401b and the second plate 406 have different transmittances and different haze values, but almost near refractive indexes.

For example, In the brightness enhancement diffuser plate shown in FIG. 4, when refractive indexes of the first protrusion 402a and the first recess 401a are 1.65 and a refractive index of the first plate 404 can be chosen in a range between 1.56~1.70. Also, when refractive indexes of the second protrusion 401b and the second recess 402b are 1.49 and a refractive index of the second plate 406 can be chosen in a range between 1.40~1.55.

With continuance reference to FIG. 4, since the first recess 401a and the second protrusion 401b are embedded to each other, and the first protrusion 402a and the second recess 402b are embedded to each other as well. An embedding interface 400 is formed between the first diffuser layer 220a and the second diffuser layer 220b. The embedding interface 400 shown in FIG. 4 may be a prism interface, or a simple geometric surface, a wavy surface, a Fourier series curve surface, a fractal curve surface and one of other nonlinear shape surfaces.

In addition, to enhance the function of the brightness enhancement diffuser plate of the invention, the first diffuser layer 220a may proceed with a matte process, thereby forming an auxiliary diffuser layer 403a over the emitting surface of the first diffuser layer 220a to enhance the diffusing effect. A transparent conductive film 403b is disposed on an incident surface of the second diffuser layer 220b to serve as electrical ground, thereby also enhancing the diffusing effect.

In conclusion, the feature of the invention is to employ the brightness enhancement diffuser plate comprised of two diffuser layers with different optical characteristics, such as, refractive index, transmittance and haze value etc. The light emitting from the backlight module is first diffused and then converged to attain optimal optical performance without increasing the number of the optical films, maintain optical performance and image quality, and thus reduce assembling time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flat panel display, comprising:
   a backlight module;
   a liquid crystal display panel disposed on the backlight module; and
   a brightness enhancement diffuser plate disposed between the backlight module and the liquid crystal display panel, including a first and a second diffuser layers embedded to each other, wherein the first diffuser layer is positioned between the liquid crystal display panel and the second diffuser layer, the second diffuser layer is positioned between the first diffuser layer and the backlight module, and the first and the second diffuser layers have different refractive indexes, different transmittances and different haze values, the refractive index of the first diffuser layer is larger than that of the second diffuser layer, the haze value of the first diffuser layer is larger than that of the second diffuser layer,
   wherein the first diffuser layer includes a first recess and a first protrusion, the second diffuser layer includes a second recess and a second protrusion, the first recess is embedded to the second protrusion and the second recess is embedded to the first protrusion, thereby forming an embedding interface between the first diffuser layer and the second diffuser layer, the embedding interface is a fractal curve surface.

2. The flat panel display according to claim 1, wherein the refractive index of the first diffuser layer is between 1.50 and 1.90.

3. The flat panel display according to claim 1, wherein the refractive index of the second diffuser layer is between 1.40 and 1.60.

4. The flat panel display according to claim 1, wherein a ratio of the refractive index of the first diffuser layer to that of the second diffuser layer is between 1.01 and 1.40.

5. The flat panel display according to claim 1, wherein the transmittance of the first diffuser layer is between 0.70 and 0.85.

6. The flat panel display according to claim 1, wherein the transmittance of the second diffuser layer is between 0.85 and 0.90.

7. The flat panel display according to claim 1, wherein the transmittance of the first diffuser layer is smaller than that of the second diffuser layer.

8. The flat panel display according to claim 1, wherein a ratio of the transmittance of the first diffuser layer to that of the second diffuser layer is between 0.70 and 1.00.

9. The flat panel display according to claim 1, wherein the haze value of the first diffuser layer is between 0.90 and 0.96.

10. The flat panel display according to claim 1, wherein the haze value of the second diffuser layer is between 0.86 and 0.90.

11. The flat panel display according to claim 1, wherein a ratio of the haze value of the second diffuser layer to that of the first diffuser layer is between 0.80 and 1.00.

12. The flat panel display according to claim 1, wherein the embedding interface between the first diffuser layer and the second diffuser layer is a prim interface, a simple geometric surface, a wavy surface, a Fourier series curve surface or one of other nonlinear shape surfaces.

13. The flat panel display according to claim 1, wherein the first diffuser layer further comprises a first plate, the first recess and the first protrusion are disposed on the first plate, the second diffuser layer further comprises a second plate, the second protrusion and the second recess are disposed on the second plate.

14. The flat panel display according to claim 13, wherein the first protrusion and the first plate have different transmittances and different haze values.

15. The flat panel display according to claim 13, wherein the second protrusion and the second plate have different transmittances and different haze values.

16. The flat panel display according to claim 1, wherein the first diffuser layer further includes an auxiliary diffuser layer disposed on an emitting surface of the first diffuser layer.

17. The flat panel display according to claim 1, wherein the second diffuser layer further includes a transparent conductive film disposed on an incident surface of the second diffuser layer.

* * * * *